US006611277B1

United States Patent
Miyazaki

(10) Patent No.: US 6,611,277 B1
(45) Date of Patent: Aug. 26, 2003

(54) INFORMATION PROCESSING APPARATUS AND METHOD AS WELL AS MEDIUM

(75) Inventor: Mitsuhiro Miyazaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 381 days.

(21) Appl. No.: 09/695,473

(22) Filed: Oct. 24, 2000

(30) Foreign Application Priority Data

Oct. 29, 1999 (JP) .......................... P11-308672

(51) Int. Cl.$^7$ .............................. G06G 5/00
(52) U.S. Cl. ...................... 345/861; 345/764
(58) Field of Search ................. 345/700, 716, 345/744, 861, 853, 764, 804, 805

(56) References Cited

U.S. PATENT DOCUMENTS 6,005,562 A * 12/1999 Shiga et al. ............... 345/700
6,040,825 A * 3/2000 Yamamoto ................ 345/173
6,209,096 B1 * 3/2001 Taruguchi ................. 705/58

* cited by examiner

Primary Examiner—Cao Kevin Nguyen
(74) Attorney, Agent, or Firm—Bell, Boyd & Lloyd LLC

(57) ABSTRACT

An information processing apparatus and method as well as a medium are disclosed by which the sizes of title screens of a menu screen can be controlled based on a history of utilization of an information distribution system to allow desired information to be searched out in a short time. Priority degrees are set to information to be distributed based on a history of utilization of the information distribution system, and a title image of the information which has a comparatively high priority degree is displayed with a comparatively great size.

7 Claims, 22 Drawing Sheets

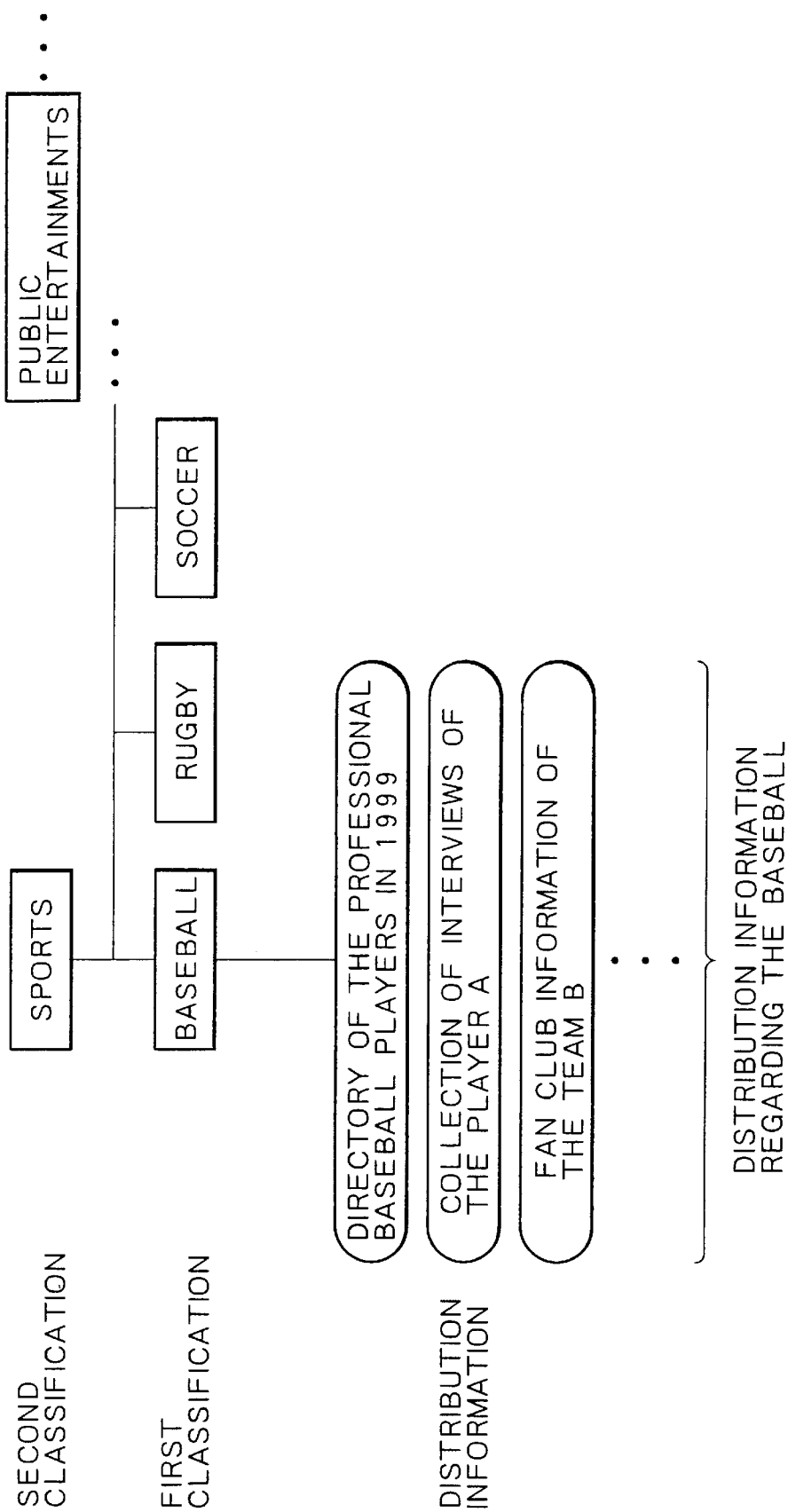

FIG. 4

| DISTRIBUTION INFORMATION | TITLE TEXT DATA | TYPE CODE DATA | TITLE IMAGE DATA |
|---|---|---|---|
| A | DIRECTORY OF THE PROFESSIONAL BASEBALL PLAYERS IN 1999 | japan-pro-record-yearbook | menu.gif |
| B | LIST OF PROFESSIONAL BASEBALL REGULAR RECORDS IN 1999 | japan-pro-record-result | home.gif |
| C | BASEBALL CARD AUCTION | japan-ama-hobby-card | title.gif |
| D | FAN CLUB INFORMATION OF THE TEAM A | japan-pro-info-teama | teama.gif |
| E | COLLECTION OF INTERVIEWS OF THE PLAYER B | japan-pro-info-playerb | playerb.jpg |
| F | FAN CLUB INFORMATION OF THE TEAM B | japan-pro-info-teamb | teamb.gif |
| G | U.S. MAJOR LEAGUE LATEST INFORMATION | abroad-pro-info-major | major.gif |
| H | COLLECTION OF INTERVIEWS OF THE PLAYER C | japan-pro-info-playerc | playerc.jpg |
| I | COLLECTION OF INTERVIEWS OF THE PLAYER A | japan-pro-info-playera | playera.jpg |
| J | RECORDS OF THE PLAYER A IN 1999 | japan-pro-info-playera | playera.jpg |
| ... | ... | ... | ... | japan-pro-info-playera
→ "JAPAN/ABROAD", "PROFESSIONAL/AMATEUR", "TYPE", "DETAILS"

DISTRIBUTION INFORMATION OF THE FIRST CLASSIFICATION "SPORTS" -
THE SECOND CLASSIFICATION "BASEBALL"

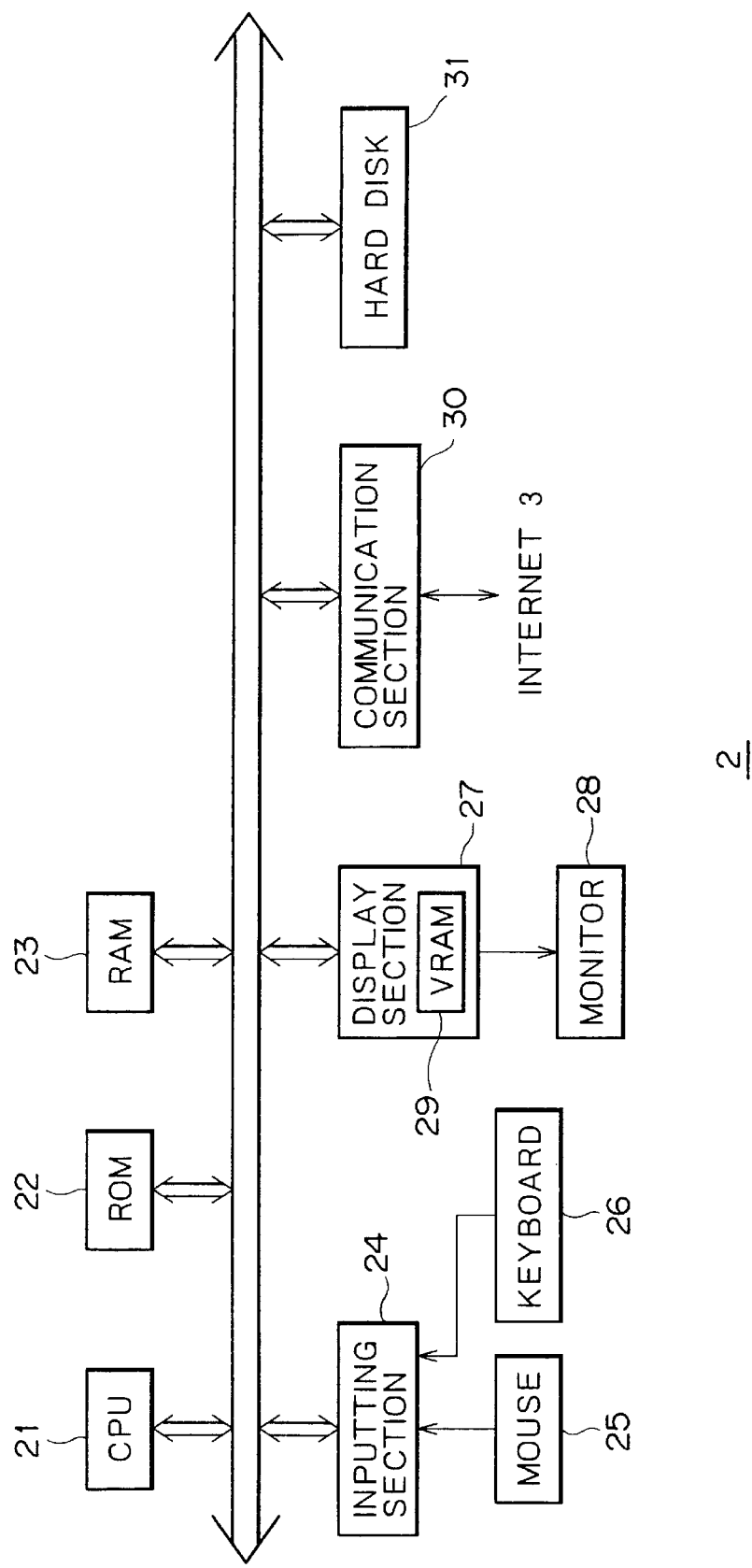

FIG. 6

| "JAPAN/ABROAD" | RATIO (%) | "PROFESSIONAL/ AMATEUR" | RATIO (%) | "TYPE" | RATIO (%) |
|---|---|---|---|---|---|
| "japan" | 77 | "pro" | 84 | "info" | 42 |
| "abroad" | 23 | "ama" | 16 | "record" | 35 |
| | | | | "hobby" | 23 |

UTILIZATION HISTORY TABLE 1

FIG. 7

| "DETAILS" | RATIO (%) |
|---|---|
| playera | 24 |
| teama | 19 |
| playerb | 15 |
| playerc | 9 |
| playerd | 6 |

UTILIZATION HISTORY TABLE 2

F I G. 12

| INFORMATION OF THIRD CLASSIFICATION | TITLE TEXT DATA | TYPE CODE DATA | TITLE IMAGE DATA | PRIORITY DEGREE (POINT) |
|---|---|---|---|---|
| A | DIRECTORY OF THE PROFESSIONAL BASEBALL PLAYERS IN 1999 | japan-pro-record-yearbook | menu.gif | 10 |
| B | LIST OF PROFESSIONAL BASEBALL REGULAR RECORDS IN 1999 | japan-pro-record-result | home.gif | 10 |
| C | BASEBALL CARD AUCTION | japan-ama-hobby-card | title.gif | 5 |
| D | FAN CLUB INFORMATION OF THE TEAM A | japan-pro-info-teama | teama.gif | 25 |
| E | COLLECTION OF INTERVIEWS OF THE PLAYER B | japan-pro-info-playerb | playerb.jpg | 20 |
| F | FAN CLUB INFORMATION OF THE TEAM B | japan-pro-info-teamb | teamb.gif | 15 |
| G | U.S. MAJOR LEAGUE LATEST INFORMATION | abroad-pro-info-major | major.gif | 10 |
| H | COLLECTION OF INTERVIEWS OF THE PLAYER C | japan-pro-info-playerc | playerc.jpg | 15 |
| I | COLLECTION OF INTERVIEWS OF THE PLAYER A | japan-pro-info-playera | playera.jpg | 35 |
| J | RECORDS OF THE PLAYER A IN 1999 | japan-pro-info-playera | playera.jpg | 35 |
| ... | | | ... | |

"JAPAN/ABROAD"   "PROFESSIONAL/AMATEUR"   "TYPE"   "DETAILS"

DISTRIBUTION INFORMATION OF THE FIRST CLASSIFICATION "SPORTS"
INFORMATION-THE SECOND CLASSIFICATION "BASEBALL"

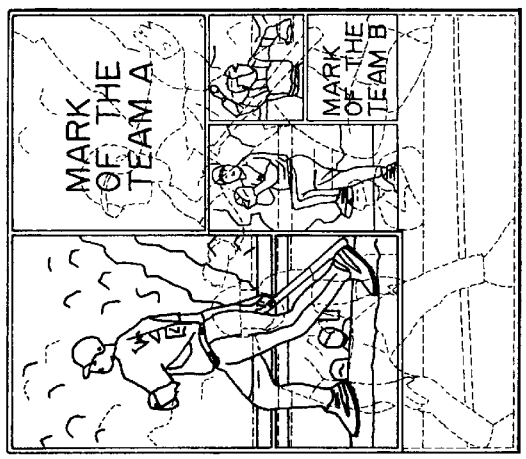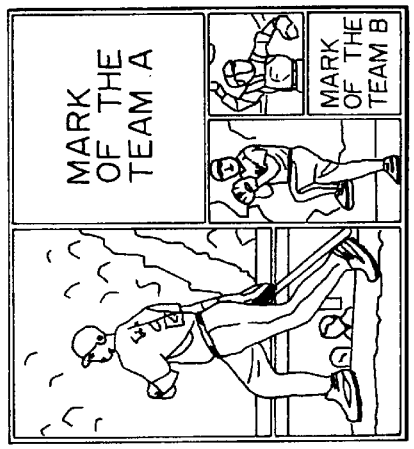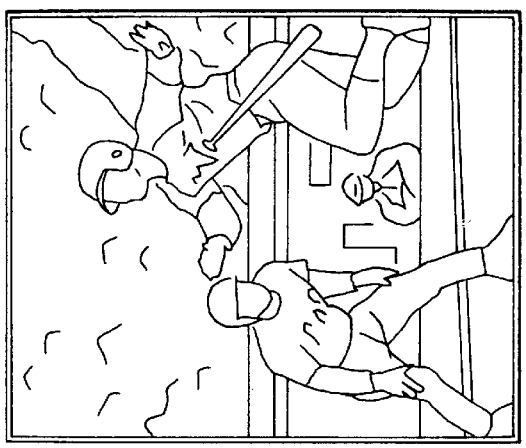

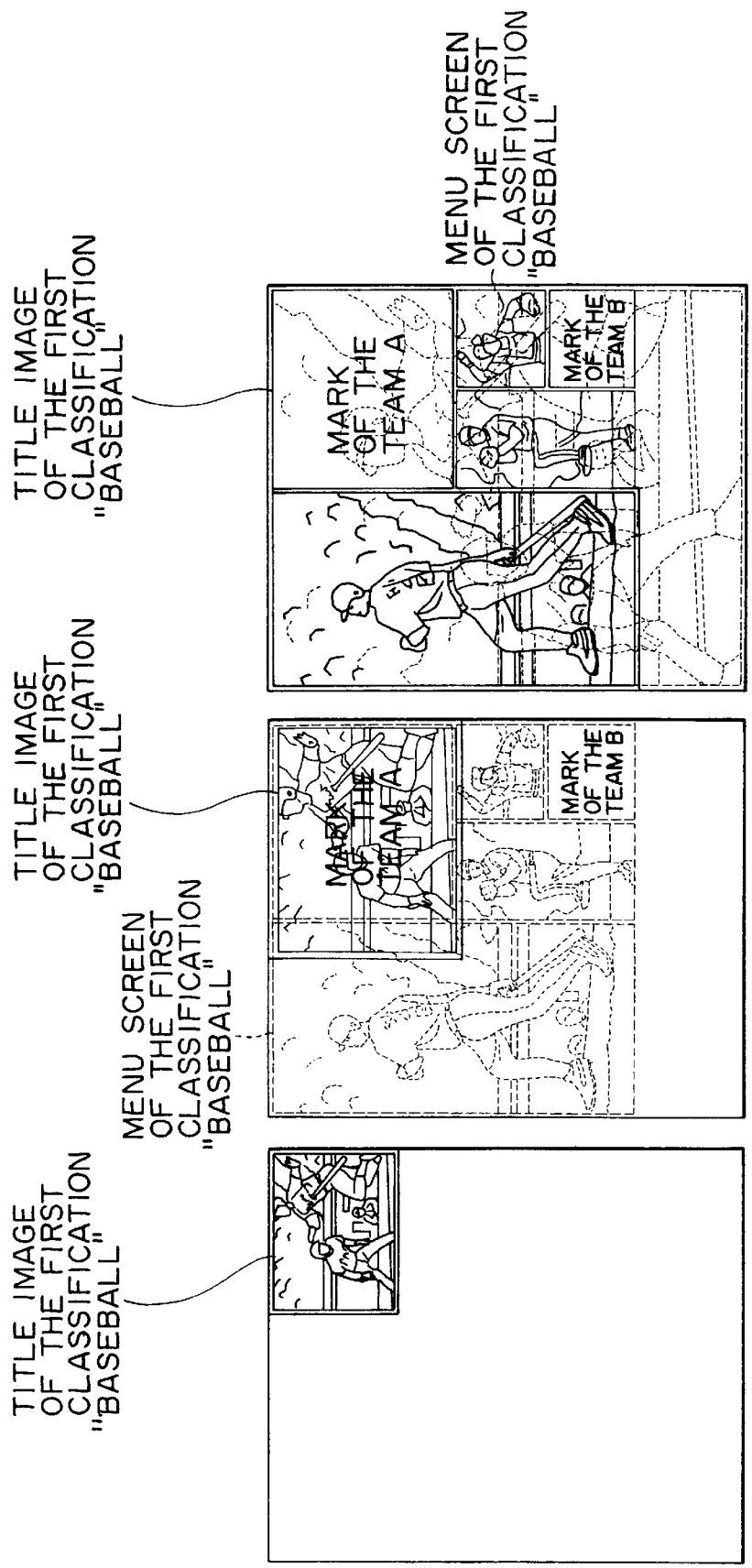

RECORDS OF THE PLAYER A IN 1999

FIG. 20

| DATE | HOUR | TITLE |
|---|---|---|
| 99/5/20 | 10:32 | ××××× |
| 99/5/20 | 10:08 | ○○○○○ |
| 99/5/19 | 22:17 | △△△△△ |
| 99/5/15 | 19:40 | □□□□□ |
| 99/5/15 | 9:10 | ×○△□○ |

INFORMATION PROCESSING APPARATUS AND METHOD AS WELL AS MEDIUM

BACKGROUND OF THE INVENTION

This invention relates to an information processing apparatus and method as well as a medium, and more particularly to an information processing apparatus and method as well as a medium by which information distributed by an information distribution system can be selected readily.

An information distribution service is available wherein predetermined information is distributed, for example, over the Internet. To make use of an information distribution service, a user must search for information to be distributed using, for example, an information search tool prior to distribution of the information.

According to a conventional information search tool, relating information is searched based on inputted predetermined search information such as a keyword. In other words, information is searched based on fixed search rules. However, it is not a practice to search for information based on, for example, a history of utilization of an information distribution system. As a result, there is a problem that information search is not performed efficiently and much time is required for a user to search out desired information.

SUMMARY OF THE INVENTION

It is an object of the present invention to provide an information processing apparatus and method as well as a medium by which information can be searched based on a history of utilization of an information distribution system so that desired information can be searched out in a short time.

To achieve the above object, according to a first aspect of the present invention, there is provided an information processing method which presents distribution information distributed thereto from a server connected thereto by a network and having predetermined type information and title image data added thereto, including:

a first storage step of storing the type information added to the presented distribution information;

a second storage step of receiving and storing the type information and the title image data added to the distributed distribution information;

a calculation step of calculating priority degrees of the distributed distribution information based on the type information added to the presented distribution information and stored at the first storage step and the type information added to the distributed distribution information and stored at the second storage step; and a display control step of controlling a display according to the title image data stored at the second storage step based on the priority degrees calculated at the calculation step.

The display control step may include the step of causing the display according to the title image data added to the distribution information which has a comparatively high priority degree to be displayed with a comparatively great size.

The display control step may also include the step of causing the display according to the title image data added to the distribution information which has a comparatively high priority degree to be displayed with a comparatively high degree of distinctness.

The information processing method, preferably, further includes:

a selection step of selecting a display of the title image data controlled at the display control step;

a first presentation step of acquiring and presenting, when the display is selected within a predetermined time at the selection step, distribution information to which the title image data of the display is added; and a second presentation step of acquiring and presenting, when the display is not selected within the predetermined time at the selection step, the distribution information having a comparatively high one of the priority degrees calculated at the calculation step from the server.

The first presentation step may include the step of acquiring the distribution information to which the priority degrees set by the server are added from the server and presents the distribution information based on the priority degrees.

To achieve the above object, according to a second aspect of the present invention, there is provided an information processing apparatus which presents distribution information distributed thereto from a server connected thereto by a network and having predetermined type information and title image data added thereto, including:

first storage means for storing the type information added to the presented distribution information;

second storage means for receiving and storing the type information and the title image data added to the distributed distribution information;

calculation means for calculating priority degrees of the distributed distribution information based on the type information added to the presented distribution information and stored in the first storage means and the type information added to the distributed distribution information and stored in the second storage means; and display control means for controlling a display according to the title image data stored in the second storage means based on the priority degrees calculated by the calculation means.

To achieve the above object, according to a third aspect of the present invention, there is provided a medium for causing a computer to execute a program for information processing when distribution information distributed from a server connected to the computer by a network and having predetermined type information and title image data added thereto is presented, the program including:

a first inputting step of inputting the type information added to the presented distribution information;

a second inputting step of inputting the type information and the title image data added to the distributed distribution information;

a calculation step of calculating priority degrees of the distributed distribution information based on the type information added to the presented distribution information and inputted by the processing in the first inputting step and the type information added to the distributed distribution information and inputted by the processing in the second inputting step; and a display control step of controlling a display according to the title image data inputted by the processing in the second inputting step based on the priority degrees calculated by the processing in the calculation step.

In the information processing method according to the first aspect, the information processing apparatus according to the second aspect, and the medium according to the third aspect, type information added to presented distribution information is inputted, and type information and title image data added to distributed distribution information are inputted. Then, priority degrees of the distributed distribution information are calculated based on the inputted type information added to the presented distribution information and the inputted type information added to the distributed distribution information, and a display according to the inputted title image data is controlled based on the calculated priority degrees.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 3 is a diagrammatic view illustrating a hierarchy of distribution information;

FIG. 4 is a view illustrating distribution information;

FIG. 5 is a block diagram showing an example of a construction of a client 2;

FIG. 6 is a view illustrating a utilization hysteresis table 1;

FIG. 7 is a view illustrating a utilization hysteresis table 2;

FIG. 12 is a view illustrating priority degrees;

FIGS. 13A to 13C and 14A to 14C are schematic views showing different examples of a menu screen;

FIG. 20 is a view showing a different example of a utilization hysteresis table;

DESCRIPTION OF THE PREFERRED EMBODIMENT

Figure 1:
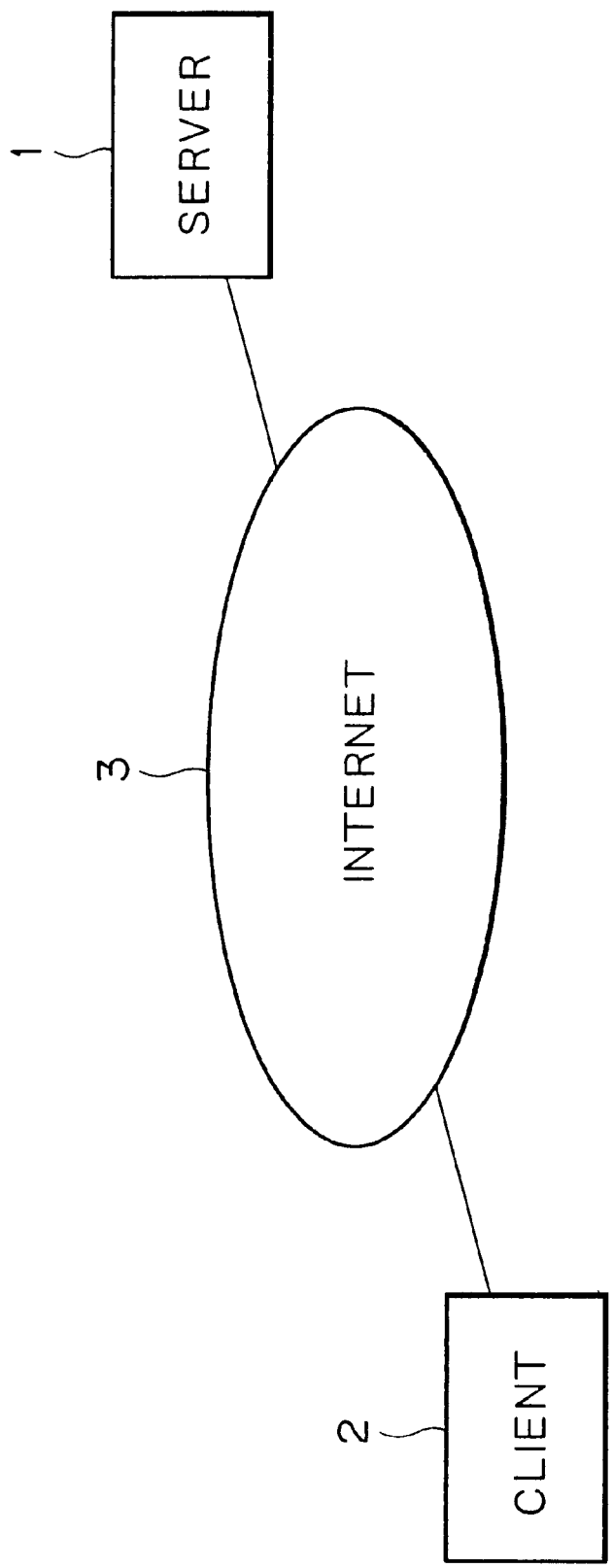
FIG. 1 is a diagrammatic view showing an example of a construction of an information distribution system to which the present invention is applied.

Referring first to FIG. 1, there is shown an example of a configuration of an information distribution system to which the present invention is applied. The information distribution system shown includes a server 1 which distributes various kinds of information to a client 2 over the Internet 3.

Figure 2:
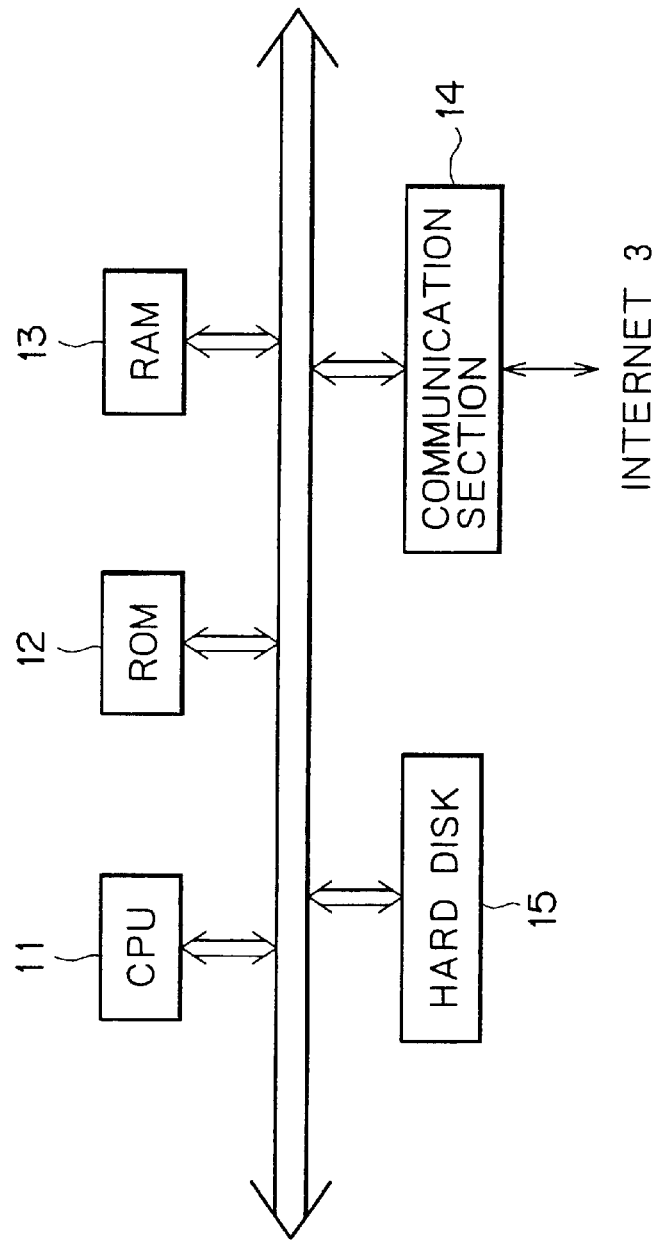
FIG. 2 is a block diagram showing an example of a construction of a server 1.

FIG. 2 shows an example of a configuration of the server 1. Referring to FIG. 2, the server 1 includes a CPU (Central Processing Unit) 11 which executes various processes in accordance with a program stored, for example, in a ROM (Read Only Memory) 12. A RAM (Random Access Memory) 13 suitably stores data necessary for the CPU 11 to execute various processes.

A communication section 14 is connected to the Internet 3, and receives data transmitted thereto over the Internet 3 and destined for the server 1 and outputs the received data to the CPU 11. Further, the communication section 14 outputs data supplied thereto from the CPU 11 to the Internet 3 in accordance with the IP (Internet Protocol).

Information to be distributed to the client 2 (such information is hereinafter referred to as distribution information) is stored on a hard disk 15. In this instance, the information is stored in a manner hierarchically classified based on contents thereof as seen from FIG. 3. For example, distribution information regarding the baseball (in the example illustrated in FIG. 3, "Directory of the professional baseball players in 1999", "Collection of interviews of the player A", "Fan club information of the team B" and so forth) belongs to the first classification "Baseball" in the higher layer.

The distribution information which belongs to the first classification "baseball" belongs to the second classification "Sports" together with distribution information classified as different kinds of sports such as distribution information regarding the rugby which belongs to the first classification "Rugby" and distribution information regarding the soccer which belongs to the first classification "Soccer".

To each of the different kinds of distribution information, title text data, type code data and title image data are added as seen in FIG. 4 which illustrates an example of distribution information A to distribution information J regarding the baseball.

The title text data is text data which indicates contents of the distribution information. For example, the title text data "Directory of the professional baseball players in 1999" is added to the distribution information A.

The type code data is predetermined code data which corresponds to contents of the distribution information. For example, the type code data of the distribution information which belongs to the first classification "Baseball" includes four identifiers "Japan/abroad", "professional/amateur", "type" and "details". For example, to the distribution information J, type code data "Japan-pro-info-playera" ("Japan" for the identifier "Japan/abroad", "pro" for the identifier "professional/amateur", "info" for the identifier "type", and "playera" for the identifier "details") is added.

For the identifier "Japan/abroad", "abroad" is settable in addition to "japan". The "japan" indicates that the distribution information relates to the baseball in Japan, and "abroad" indicates that the distribution information relates to the baseball abroad. For the identifier "professional/ amateur", "ama" is settable in addition to "pro". The "pro" indicates that the distribution information relates to the professional baseball, and the "ama" indicates that the distribution information relates to the amateur baseball.

For the identifier "type", "hobby", "record" and so forth are settable in addition to "info". The "info" indicates that the distribution information relates to general information, and the "record" indicates that the distribution information relates to records of the baseball while the "hobby" indicates that the distribution information relates to playthings relating to the baseball. In other words, to the identifier "type", information which further finely classifies information classified with the identifier "Japan/abroad" and the identifier "professional/amateur" is set.

For the identifier "details", "yearbook", "major", "result", "card", "teama" and so forth are settable in addition to "playera". The "playera" indicates that the distribution information relates to the player A; the "yearbook" indicates that the distribution information relates to the directory of the players of the year; the "major" indicates that the distribution information relates to the major league; the "card" indicates that the distribution information relates to a baseball card; and the "teama" indicates that the distribution information relates to the team A. In other words, for the identifier "details", information which further finely classifies information classified with the identifier "Japan/abroad", the identifier "professional/amateur" and the identifier "type" is settable. It is to be noted that, in the following description, where different kinds of information set to the identifiers of type code data described above need not be identified from one another, they are referred to simply as identification information.

The title image data is image data of an image corresponding to contents of the distribution information (in FIG. 4, a file name with which title image data is filed is shown). In the present example, the title image data is provided for each of different kinds of the identifier "details" of the type code data, and the same title image data is added to different kinds of distribution information to which type code data having the same kind of the identifier "details" are added. For example, the file "playera.jpg" is added to the distribution information I and the distribution information J which have the type code data including "playera" set to the identifier "details" thereof.

It is to be noted that, while, in the present example, the same title image data is added to different pieces of distribution information to which the type code data having the same identifier "details" are added, title image data to be added may otherwise be determined in accordance with another criterion.

FIG. 5 shows an example of a configuration of the client 2. Referring to FIG. 5, the client 2 shown includes a CPU 21 which executes various processes in accordance with a program stored in a ROM 22 or on a hard disk 31. A RAM 23 suitably stores data necessary for the CPU 21 to execute various processes.

An inputting section 24 is connected to a mouse 25, a keyboard 26 and so forth and outputs a signal corresponding to an operation of the mouse 25 or the keyboard 26 to the CPU 21. A display section 27 has a built-in VRAM (Video RAM) 29 having a storage area corresponding to pixels of a screen of a monitor 28 and outputs an image signal corresponding to values of the storage area to the monitor 28.

A communication section 30 outputs data received over the Internet 3 to the CPU 21 and outputs data supplied thereto from the CPU 21 to the Internet 3.

The hard disk 31 stores application programs such as, for example, a WWW browser and stores a utilization history table 1 and a utilization history table 2 which are updated in response to utilization of distribution information. FIG. 6 illustrates the utilization history table 1 which is based on utilization of distribution information which belongs to the first classification "baseball". As seen from FIG. 6, the utilization history table 1 is shown including ratios of the identifier "Japan/abroad", the identifier "professional/amateur", the identifier "type" and the identifier "details" of type code data added to utilized distribution information. According to the example of FIG. 6, 77% of the type code data added to the distribution information utilized by the user have "japan" set thereto as the identifier "Japan/abroad" while the remaining 23% of the type code data have "abroad" set thereto as the identifier "Japan/abroad". In other words, of the utilized distribution information, 77% are information relating to the domestic baseball, and 23% are information relating to the baseball abroad.

Further, 84% of the type code data added to the utilized distribution information have "pro" set thereto as the identifier "professional/amateur", and 16% of the type code data have "ama" set thereto as the identifier "professional/amateur". In other words, of the utilized distribution information, 84% are information relating to the professional baseball, and 16% are information relating to the amateur baseball.

Furthermore, 42% of the type code data added to the utilized distribution information have "info" set thereto as the identifier "type", 35% of the type code data have "record" set thereto as the identifier "type", and 23% of the type code data have "hobby" set thereto as the identifier "type". In other words, of the utilized distribution information, 42% are general information, 35% are record information, and 23% are information relating to playthings.

FIG. 7 illustrates the utilization history table 2 based on utilization of distribution information which belongs to the first classification "baseball". As can be seen from FIG. 7, the utilization history table 2 indicates ratios of the identifier "details" of type code data added to utilized distribution information. According to the example illustrated in FIG. 7, 24% of the type code data added to the distribution information utilized by the user have "playera" set thereto as the identifier "details". In other words, of the utilized distribution information, 24% relate to the player A.

Further, 19% of the type code data have "teama" set thereto as the identifier "details"; 15% of the type code data have "playerb" set thereto as the identifier "details"; 9% of the type code data have "playerc" set thereto as the identifier "details"; and 6% of the type code data have "playerd" set thereto as the identifier "details". In other words, of the type code data, 19% relate to the team A; 15% relate to the player B; 9% relate to the player C; and 6% relate to the player D.

Figure 8:
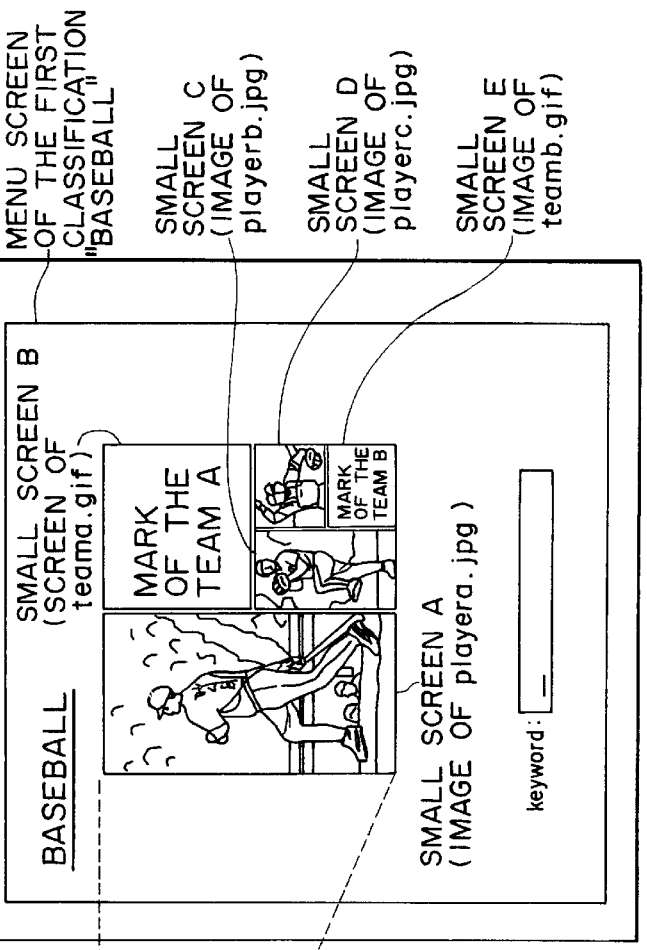
FIGS. 8A and 8B are schematic views showing different examples of a menu screen.
Figure 9:
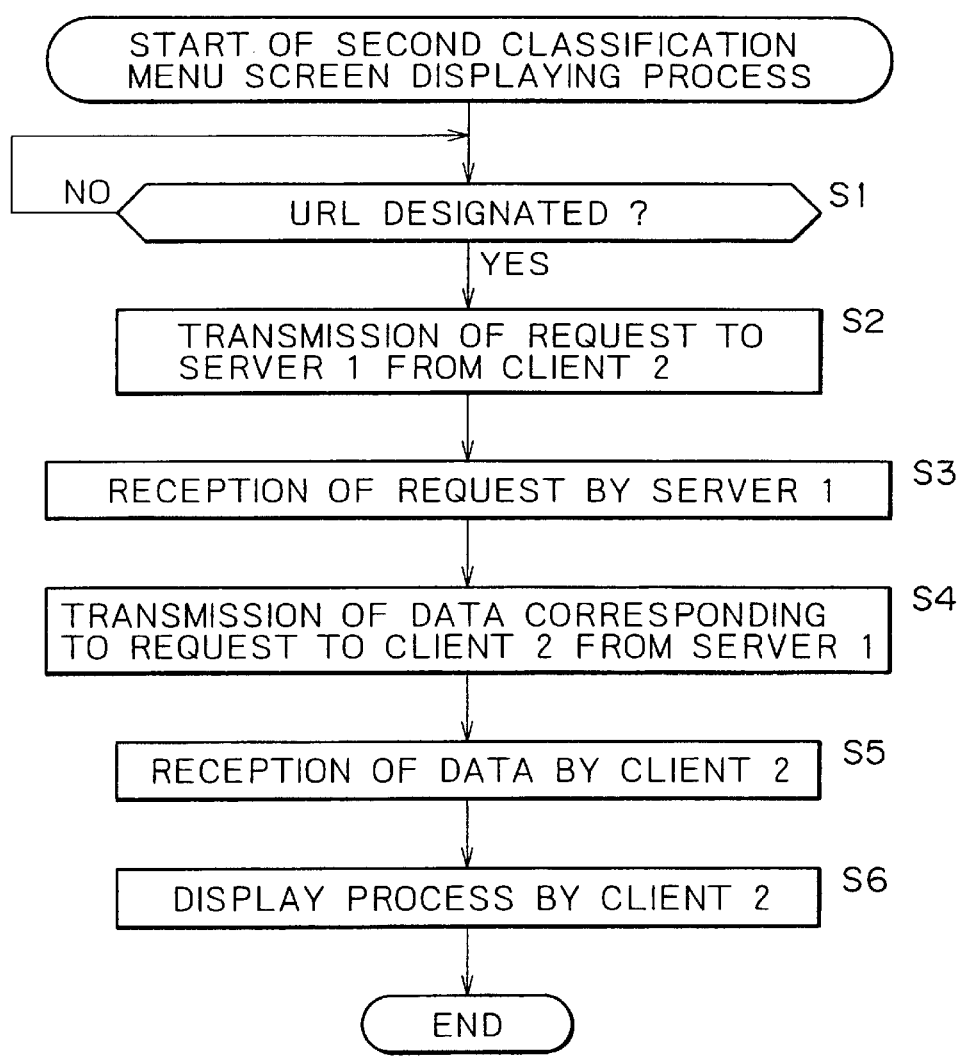
FIG. 9 is a flow chart illustrating a menu screen displaying process of the second classification.

Subsequently, a processing procedure of the server 1 and the client 2 when such a menu screen for the second classification as shown in FIG. 8A is displayed is described with reference to a flow chart of FIG. 9. It is to be noted that a menu screen of the second classification "sports" is shown displayed in FIG. 8A.

First in step S1, the CPU 21 of the client 2 waits until a URL (Uniform Resource Locator) of a home page is inputted by the user, and when a URL is inputted, the processing advances to step S2. In step S2, the CPU 21 of the client 2 transmits an HTTP command for requesting for data of the home page designated by the URL to the server 1 over the Internet 3. In the present example, a command for requesting for data of a home page for distribution information which belongs to the second classification "sports" is transmitted.

In step S3, the CPU 11 of the server 1 receives the HTTP command transmitted from the client 2 in step S2 through the communication section 14. Then in step S4, the CPU 11 of the server 1 reads out data of the home page designated with the HTTP command (in the present example, data of a home page for distribution information which belongs to the second classification "sports" and so forth) from the hard disk 15 and transmits the data to the client 2 through the communication section 14.

In step S5, the CPU 21 of the client 2 receives the data transmitted thereto from the server 1 (data of the home page for distribution information which belongs to the second classification "sport" and so forth). Then in step S6, the CPU 21 of the client 2 performs processing (display processing) of the data of the home page in accordance with a program of the browser. Consequently, such a menu screen of the second classification "sports" as seen in FIG. 8A is displayed on the monitor 28.

On the menu screen of the second classification "sport" of FIG. 8A, images (title images) of the "baseball", "rugby", "basketball", "soccer", "swimming" and "sumoh wrestling" from within the first classification which belong to the second classification "sports" are displayed. The user will refer to the menu screen of the second classification on which the title images of the first classifications are displayed in this manner to find out the first classification to which desired distribution information belongs. For example, the user can operate the mouse 25 of the client 2 to move a pointer (not shown) to the title image of the first classification to which the desired distribution information is estimated to belong and double click the title image to select the first classification. Further, the user can operate, for example, an arrow mark in an icon section displayed on the monitor 28 to cause the title image of another first classification to be displayed on the menu screen.

Figure 10:
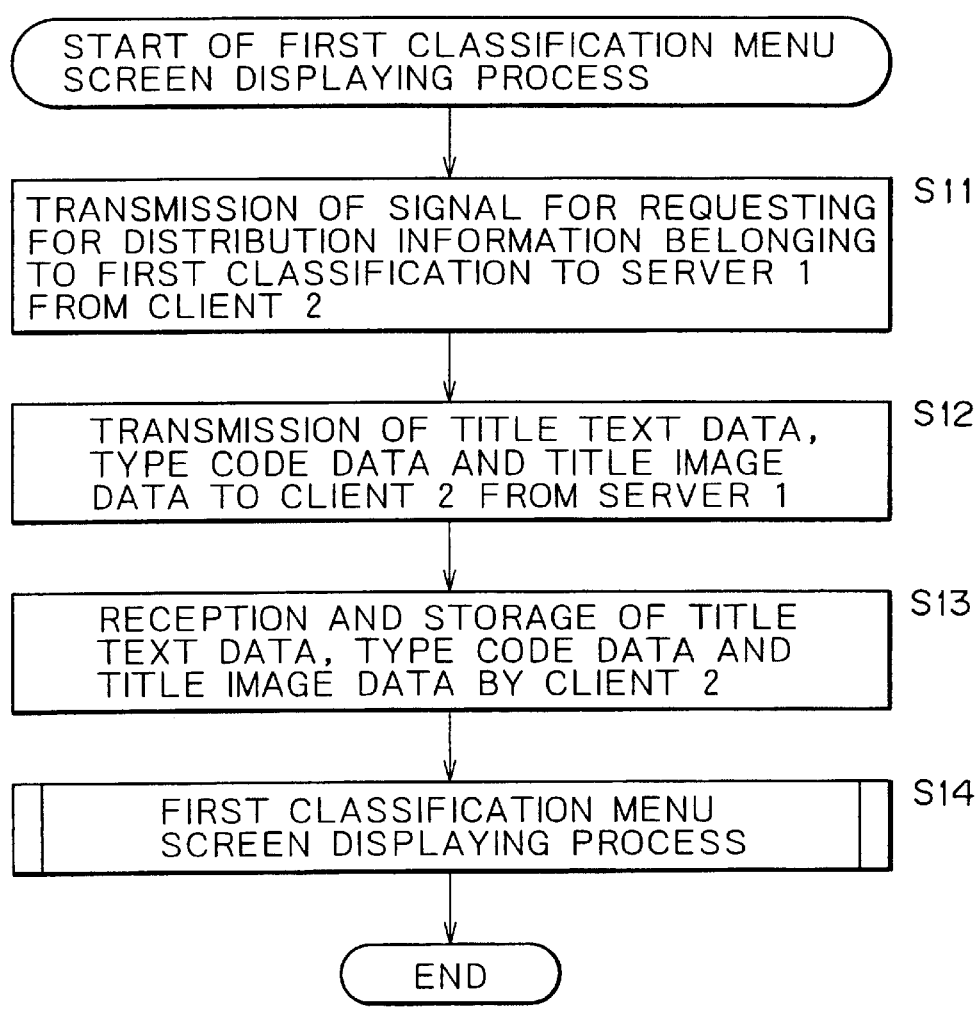
FIG. 10 is a flow chart illustrating a menu screen displaying process of the first classification.

Subsequently, a processing procedure of the server 1 and the client 2 when such a menu screen of the first classification as shown in FIG. 8B is described with reference to a flow chart of FIG. 10.

When the menu screen of the second classification "sports" shown in FIG. 8A is displayed on the monitor 28, if the user operates the mouse 25 to move a cursor (not shown) to a displayed location of the title image of, for example, the "baseball" and double click the displayed location of the title image, then the CPU 21 of the client 2 transmits a signal for requesting for distribution information which belongs to the first classification "baseball" to the server 1 through the communication section 30 in step S11.

In step S12, the CPU 11 of the server 1 receives the signal from the client 2, reads out title text data, type code data and title image data added to the distribution information which belongs to the first classification "baseball" designated with the received signal from the hard disk 15, and transmits the read out data to the client 2 through the communication section 14. It is to be noted that, in the example illustrated, also title text data, type code data and title image data added to the distribution information A through the distribution information J illustrated in FIG. 4 are transmitted from the server 1 to the client 2.

In step S13, the CPU 21 of the client 2 receives the title text data, type code data and title image data transmitted thereto from the server 1 in step S12 through the communication section 30 and stores the received data into the RAM 23.

Then in step S14, the CPU 21 of the client 2 produces a menu screen of the first classification "baseball" based on the utilization history table 1 and the utilization history table 2 stored on the hard disk 31 and outputs the menu screen to the monitor 28 through the display section 27 so that the menu screen is displayed on the monitor 28 (FIG. 8B). In the present example, such distribution information as is considered to favorable to the user, that is, the text image added to distribution information which is most likely to be utilized by the user, is displayed in a comparatively great size. Details of the process in step S14 are illustrated in a flow chart of FIG. 11.

In particular, in step S31, the CPU 21 of the client 2 detects matching of the identification information set to the identifiers of the type code data (FIG. 4) stored in the RAM 23 with the utilization history table 1 and the utilization history table 2 stored on the hard disk 31, determines priority degrees of the identification information based on a result of the matching and stores the priority degrees into the RAM 23. In the following, the process here is described in more detail.

Where those of the kinds of the identification information which have higher ratios in the individual columns ("Japan/abroad", "professional/amateur" and "type") of the utilization history table 1 (in the example of FIG. 6, "japan", "pro" and "info") are set to the identifiers "Japan/abroad", "professional/amateur" and "type" of type code data, 5 points are provided to the distribution information to which the type code data are added. Meanwhile, where the identification information in the identifier "details" of type code data in the utilization history table 2 has the highest ratio (in the example shown in FIG. 7, "playera") set thereto, 20 points are provided as a priority degree to the distribution information to which the type code data is added; where the identification information has the second highest ratio (in the example shown in FIG. 7, "teama") set thereto, 10 points are provided as a priority degree to the distribution information to which the type code data is added; and where the identification information has the third highest ratio (in the example of FIG. 7, "playerb") set thereto, 5 points are provided as a priority degree to the distribution information to which the type code data is added. It is to be noted that, where the identification information has the fourth highest ratio or the like (in the example of FIG. 7, "playerc" and "playerd") set thereto in the identifier "details", no point is provided to the distribution information to which the type code data is added.

Thus, a sum total of the priority degrees provided to each of the pieces of distribution information based on the utilization history table 1 and the utilization history table 2 is used as a final priority degree of the kind of distribution information.

A method of calculating a priority degree is described more specifically taking the distribution information C and the distribution information I illustrated in FIG. 4 as examples. Since the type code data "japan-ama-hobby-card" is added to the distribution information C, the priority degree according to the utilization history table 1 of FIG. 6 is 5 points because "japan" is set in the identifier "Japan/abroad". Meanwhile, the priority degree according to the utilization history table 2 of FIG. 7 is 0 points (has no point provided thereto) because "card" is set in the identifier "details", or in other words, because none of "playera", "teama" and "playerb" is set. After all, the priority degree of the distribution information C is 5 (=5+0) points.

On the other hand, since the distribution information I has type code data "japan-pro-info-playera" added thereto, the totaling priority degree according to the utilization history table 1 is 15 points consisting of 5 points provided because "japan" is set in the identifier "Japan/abroad", 5 points provided because "pro" is set in the identifier "professional/amateur" and 5 points provided because "info" is set in the identifier "type". Meanwhile, the priority degree according to the utilization history table 2 is 20 points because "playera" is set in the identifier "details". After all, the priority degree of the distribution information is 35 points.

Priority degrees of different kinds of distribution information are determined based on a utilization history in such a manner as described above. After priority degrees are determined in this manner, the CPU 21 stores the priority degrees into the RAM 23 in a corresponding relationship to the kinds of distribution information as seen in FIG. 12.

Then in step S32, the CPU 21 plots, as shown in FIG. 8B, a frame of the largest small screen A from among the small screens to be displayed on the menu screen in the VRAM 29 through the display section 27, reads out title image data of the distribution information having the highest priority degree given thereto (in the example of FIG. 12, image data filed in playera.jpg) and plots the title image data so as to match with the frame.

In step S33, the CPU 21 plots, as shown in FIG. 8B, a frame of the second largest small screen B (for example, of a size equal to 50% that of the small screen A) from among the small screens to be displayed on the menu screen in the VRAM 29 through the display section 27, reads out title image data added to the distribution information having the second highest priority degree given thereto (in the example of FIG. 12, title image data filed in teama.gif) and plots the title image data so as to match with the frame.

Then in step S34, the CPU 21 plots, as shown in FIG. 8B, a frame of the third largest small screen C (for example, of a size equal to 25% that of the small screen A) from among the small screens to be displayed on the menu screen in the VRAM 29 through the display section 27, reads out title image data added to the distribution information having the third highest priority degree given thereto (in the example of FIG. 12, title image data filed in playerb.jpg) and plots the title image data so as to match with the frame.

Then in step S35, the CPU 21 plots, as shown in FIG. 8B, two frames of the fourth largest small screens D and E (for example, of a size equal to 12% that of the small screen A) from among the small screens to be displayed on the menu screen in the VRAM 29 through the display section 27, reads out title image data added to the distribution information having the fourth and following highest priority degrees given thereto (in the example of FIG. 12, title image data filed in playerc.jpg and teamb.gif) and plots the title image data so as to match with the frame.

In step S36, the CPU 21 controls the display section 27 to output the image data plotted in the VRAM 29 to the monitor 28 so that the image data may be displayed on the monitor 28.

Figure 11:
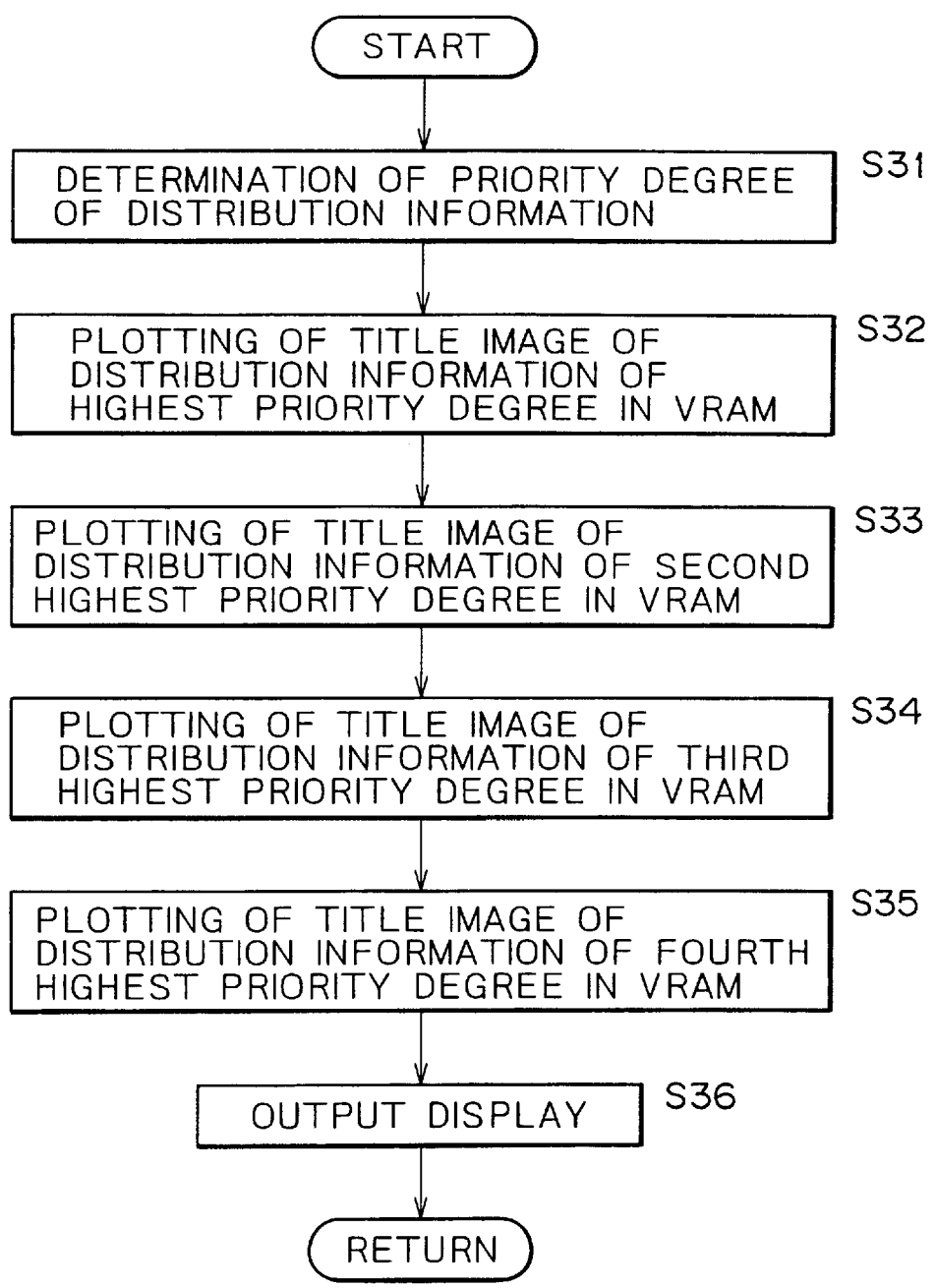
FIG. 11 is a flow chart illustrating a process in step S14 of FIG. 10.

When the menu screen of the first classification "baseball" shown in FIG. 8B is displayed on the monitor 28 in such a manner as described above, the processing is completed, and also the processing of FIG. 11 comes to an end.

Since priority degrees of distribution information are determined based on a utilization history of a user in this manner, the title image added to distribution information which is comparatively favorable to the user, that is, to distribution information which is comparatively likely to be utilized, is displayed in a comparatively large size. Consequently, the user can search out distribution information to be utilized readily and efficiently.

It is to be noted that, while the foregoing description is given in connection with an example wherein a title image of distribution information which is comparatively favorable to a user is displayed in a comparatively large size, it is otherwise possible to display a title screen of distribution information having a high priority degree with a high degree of distinctness as seen in FIG. 13C. In the example just mentioned, if the title screen of the first classification "baseball" is selected on the menu screen of the second classification "sports" of FIG. 8A in response to an operation of a user, then the image is displayed in an enlarged scale (zoomed state) with the density reduced as seen in FIG. 14, and the menu screen of the first classification "baseball" produced by the processing described hereinabove with reference to the flow chart of FIG. 10 is displayed with an increased density. Consequently, such a menu screen of the first classification "baseball" as shown in FIGS. 13C and 14C is displayed finally.

Figure 15:
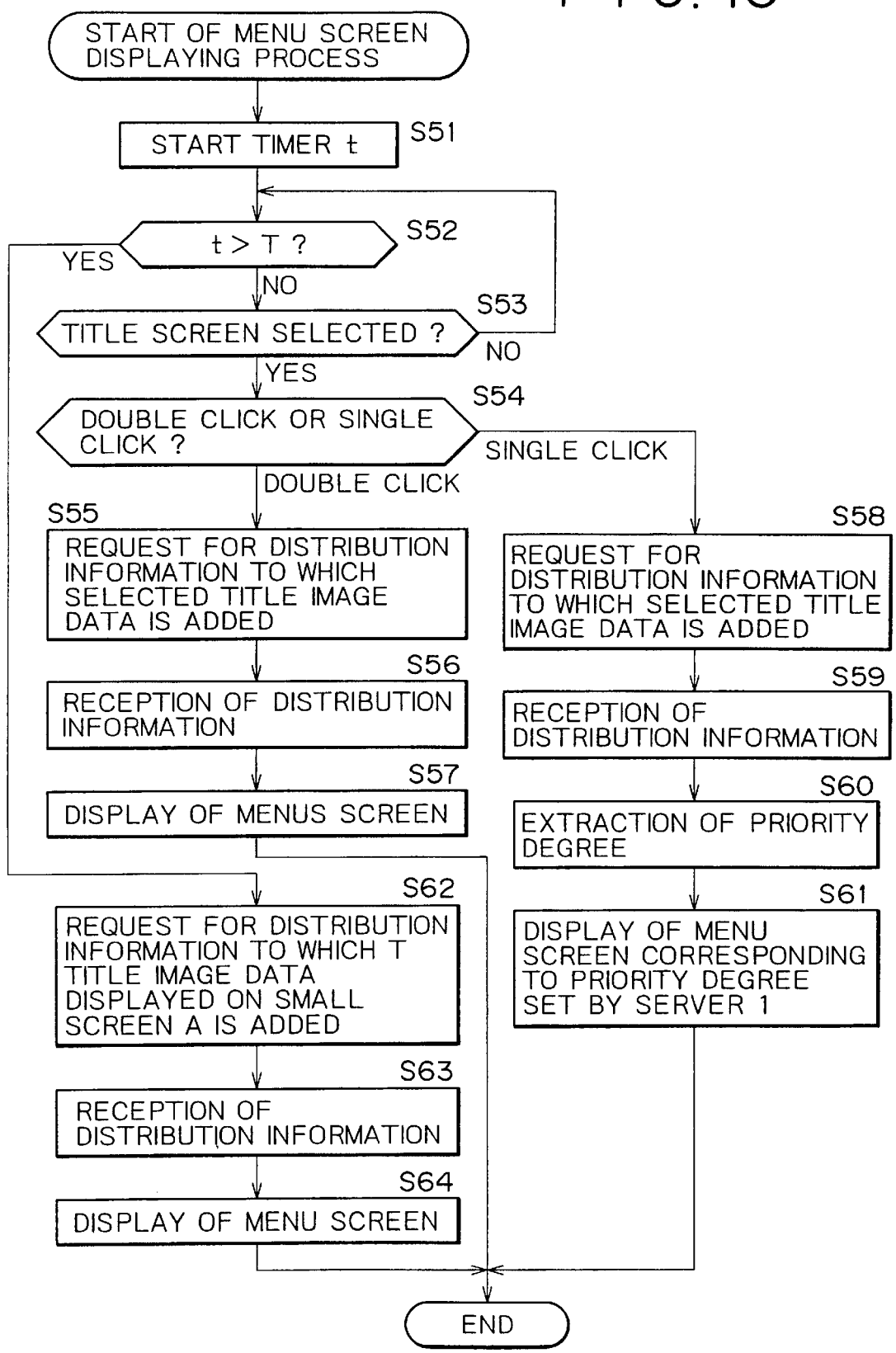
FIG. 15 is a flow chart illustrating a menu screen displaying process of distribution information.

Subsequently, operation of the client 2 for displaying a menu screen of distribution information is described with reference to a flow chart of FIG. 15. If the menu screen of the first classification "baseball" shown in FIG. 8B or 13C is displayed on the monitor 28 by the processing in step S14 of FIG. 10, then the CPU 21 starts measurement of time by means of a timer t built therein in step S51. Then in step S52, the CPU 21 discriminates whether or not the measured value of the timer t exceeds a predetermined time T. If it is discriminated that the measured value of the timer t does not exceed the predetermined time T, then the processing advances to step S53.

In step S59, the CPU 21 of the client 2 discriminates whether or not one of the small screens A to E is selected as a result of an operation (double clicked or single clicked) of the mouse 25 by the user. If it is discriminated that one of the small screens A to E is selected, then the processing advances to step S54, in which the CPU 21 discriminates whether the operation in step S53 depends upon double clicking or single clicking. If it is discriminated that the selection in step S53 depends upon double clicking, then the processing advances to step S55.

In step S55, the CPU 21 of the client 2 transmits a signal for requesting for distribution information to which the title image data displayed on the small screen selected in step S53 is added to the server 1 through the communication section 30. In the present example, if it is assumed that, for example, the small screen A (image of playera.jpg) is double clicked by the mouse 25, then the CPU 21 transmits a signal for requesting for distribution information to which playera.jpg is added (in the example of FIG. 4, the distribution information I and the distribution information J) to the server 1. In response to the signal, the server 1 transmits distribution information to which playera.jpg is added to the client 2.

Then in step S56, the CPU 21 of the client 2 receives the distribution information transmitted thereto from the server 1 through the communication section 30 and having playera.jpg added thereto. In step S57, the CPU 21 reads out, for example, title text data of the received distribution information from the RAM 23 and signals the title text data to the monitor 28 through the display section 27 so that the title text data is displayed on the monitor 28 as shown in FIG. 16D. It is to be noted that, in this instance, the small screen A (image of playera.jpg) is zoomed such that it may change step by step, for example, from the screen of FIG. 16A (screen similar to that of FIG. 8B) to the screen of FIG. 16B and then to the screen of FIG. 16C, and finally, a screen of FIG. 16D is displayed.

If it is discriminated in step S54 that the selection in step S53 depends upon single clicking, then the processing advances to step S58, in which the CPU 21 transmits a signal for requesting for distribution information to which the title screen data (playera.jpg) of the small screen A selected in step S53 is added to the server 1 through the communication section 30 similarly as in step S55. In response to the signal, the server 1 transmits distribution information to which playera.jpg is added to the client 2. In this instance, however, each of the kinds of distribution information to be transmitted to the client 2 has added thereto a predetermined priority degree which has been set by the server 1 side (service provider side).

Then in step S59, the CPU 21 of the client 2 receives the distribution information transmitted thereto from the server 1 through the communication section 30 and having priority degrees added thereto. Then in step S60, the CPU 21 extracts the priority degrees.

Then in step S61, the CPU 21 of the client 2 displays the title text data, which have been read out from the RAM 23, of the distribution information received in step S58 in accordance with the priority degrees extracted in step S60. For example, if the priority degree added to the distribution information J is higher then the priority degree added to the distribution information I, then the title "Records of the player A in 1999" of the distribution information J is displayed with a greater size than the title "Collection of interviews of the player A" of the distribution information I. Since priority degrees are added to distribution information to be transmitted to the client 2 in this manner, information which is desired to be utilized can appeal to the user.

If it is discriminated in step S53 that no small screen is selected, then the processing returns to step S52. If it is discriminated in step S53 that the measured value of the timer t exceeds the time T, then the processing advances to step S62.

In step S62, the CPU 21 of the client 2 transmits to the server 1 a signal for requesting distribution information to which the title screen data displayed in the largest small screen A from among the small screens of the menu screen of the first classification "baseball" is added. In the example of FIG. 8B or 13C, a signal for requesting for distribution information including the distribution information I and the distribution information J to which the title image data (playera.jpg) displayed on the small screen A is added is transmitted to the server 1. In response to the signal, the server 1 transmits distribution information to which playera.jpg is added to the client 2.

Figure 16:
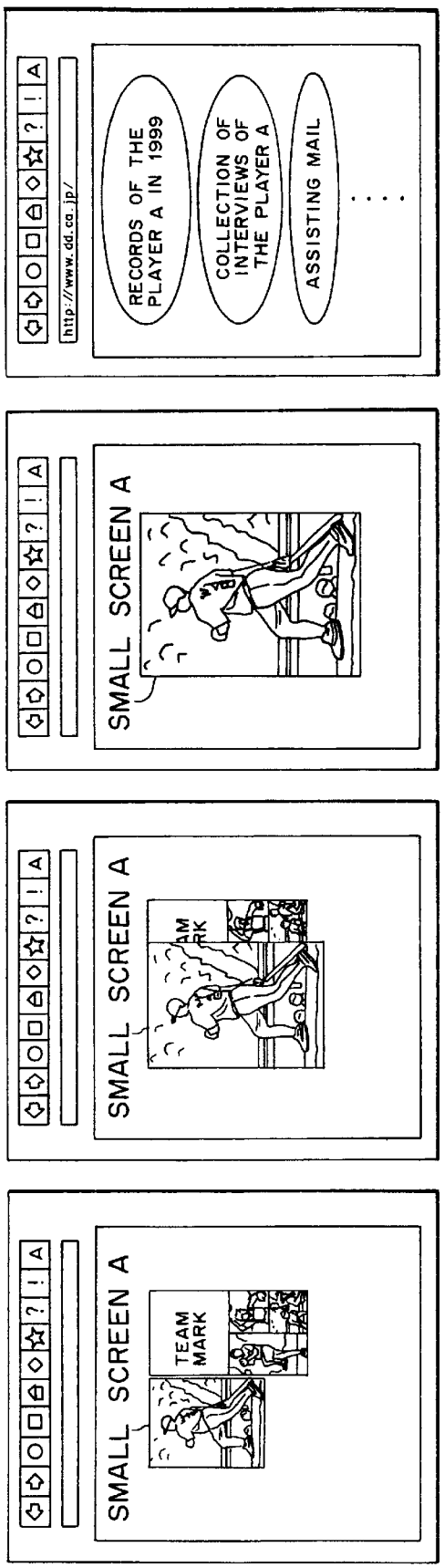
FIGS. 16A to 16D, 17 and 18 are schematic views showing different examples of a menu screen.
Figure 17:
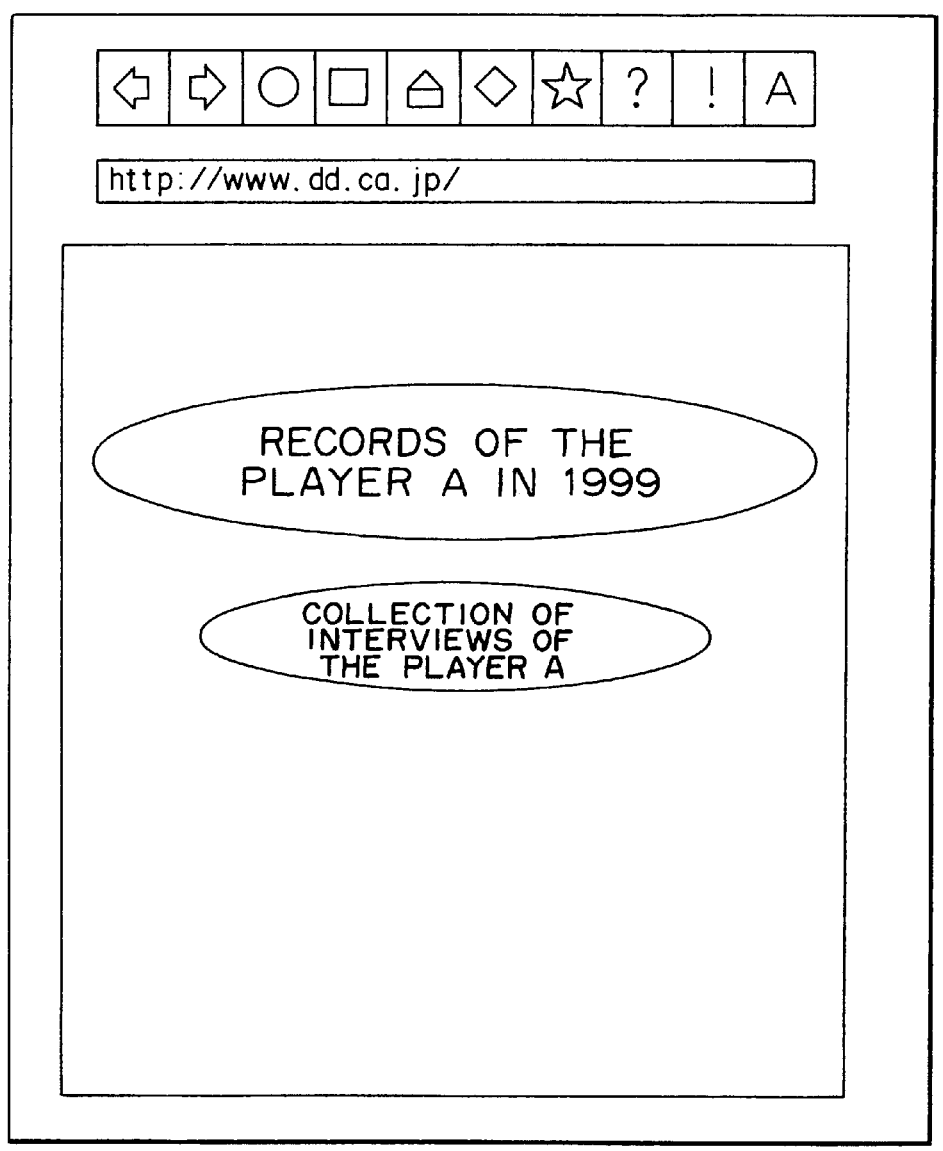

In step S63, the CPU 21 of the client 2 receives the distribution information transmitted thereto from the server 1 through the communication section 30. Then in step S64, the CPU 21 signals the title text data added to the distribution to the monitor 28 through the display section 27 so that the title text data is displayed on the monitor 28 as shown in FIG. 16D. In this instance, such zoomed displaying as shown in FIG. 16 may be performed similarly as in step S57.

Since the time in which no operation is performed by a user is measured in this manner, if no operation is performed within a predetermined time, then the title of distribution information which is favorable to the user can be displayed on the monitor 28. Consequently, the user can select distribution information favorable to the user itself readily.

When a predetermined menu screen is displayed by the processing in step S57, S61 or S64 as described above, the processing comes to an end.

Figure 18:
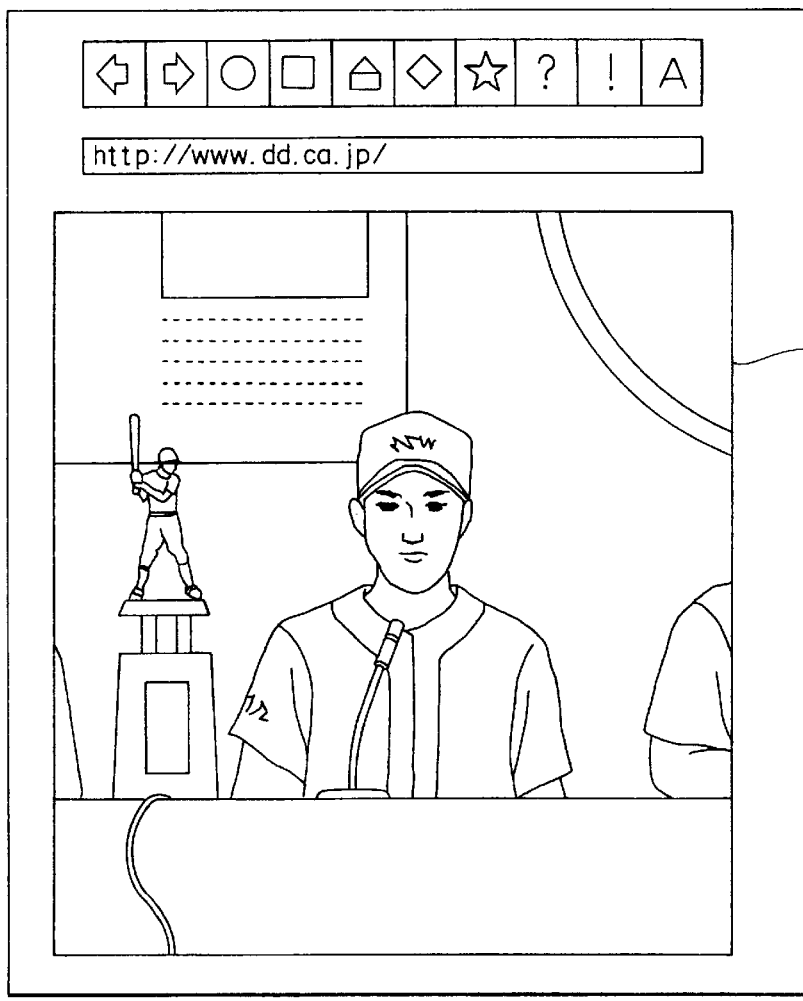

It is to be noted that, while, in the foregoing description, when a small screen is selected on the menu screen of the first classification "baseball", the title of distribution information to which text image data displayed on the selected small screen is added is displayed, alternatively a predetermined image may be displayed in place of the text as shown in FIG. 18.

Figure 19:
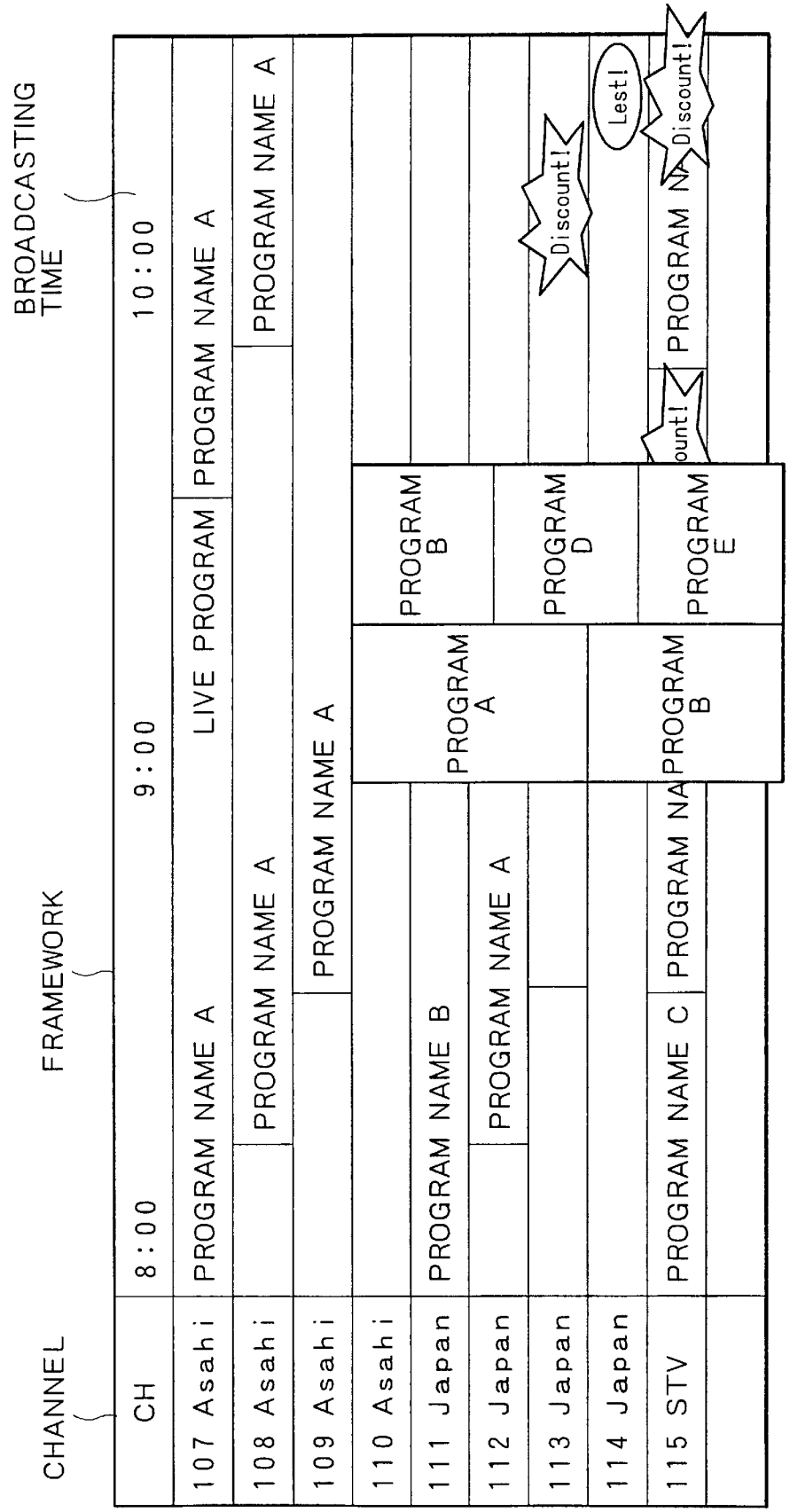
FIG. 19 is a diagrammatic view showing a yet further example of a menu screen.

Further, while the foregoing description is given of an example wherein information is distributed over the Internet 3, the present invention can be applied also where a program is provided in multi-channel digital satellite broadcasting. For example, as shown in FIG. 19, a predetermined menu screen which displays a title image of that one of programs provided which is favorable to a user is displayed together with an electronic program table. Consequently, the user can select a program favorable to the user readily.

Further, while, in the foregoing description, priority degrees of distribution information are determined based on the utilization history table 1 (FIG. 6) and the utilization history table 2 (FIG. 7), it is otherwise possible to additionally provide such a table which stores distribution information utilized recently as seen in FIG. 20 and determine priority degrees utilizing the table.

While the series of processes described above can be executed by hardware, it may otherwise be executed by software. Where the series of processes is executed by software, a program which constructs the software is installed into a computer incorporated in each of the server 1 and the client 2 as hardware for exclusive use or, for example, a personal computer for universal use which can execute various functions by installing various programs.

Now, a medium which is used to install the program for execution of the series of processes described above into a computer so that the program may be executed by the computer is described taking a case wherein the computer is a personal computer for universal use as an example.

Figure 21A:
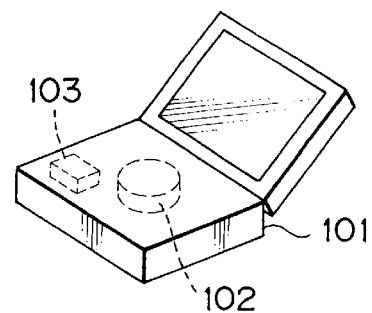
FIGS. 21A to 21C are schematic views showing different kinds of media.
Figure 21B:
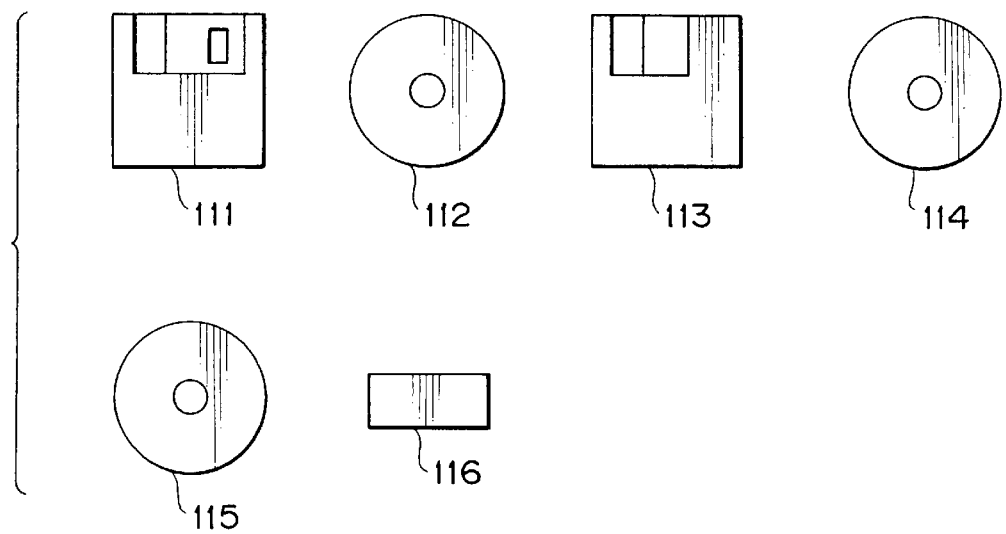
Figure 21C:
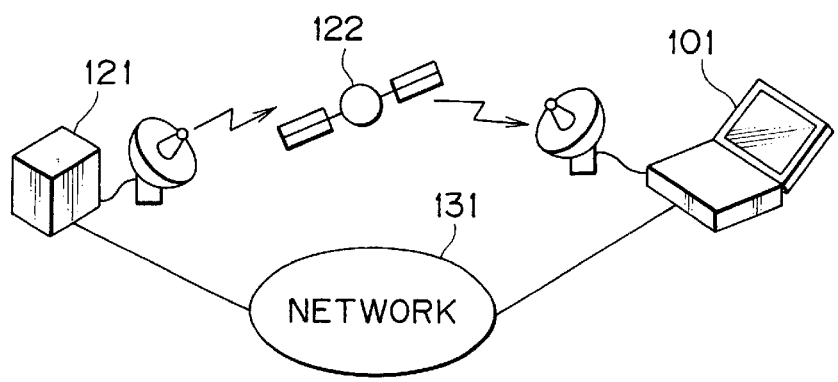

The program can be provided to a user in such a form that it is installed in advance in a hard disk 102 or a semiconductor memory 103 as a recording medium built in a personal computer 101 as shown in FIG. 21A.

As an alternative, the program may be provided as package software by temporarily or permanently storing or recording it on such a recording medium as a floppy disk 111, a CD-ROM (Compact Disc Read Only Memory) 112, an MO (Magneto-optical) disk 113, a DVD (Digital Versatile Disc) 114, a magnetic disk 115 or a semiconductor memory 116.

As another alternative, the program may be transferred by radio to the personal computer 101 from a down load site 121 through an artificial satellite 122 for digital satellite broadcasting, or may be transferred by wire to the personal computer 101 over a network 131 such as a local area network or the Internet and then stored into the built-in hard disk 102 by the computer 101.

It is to be noted that the term "medium" in the present specification is used to signify a medium in a broad sense including all such media as mentioned hereinabove.

Figure 22:
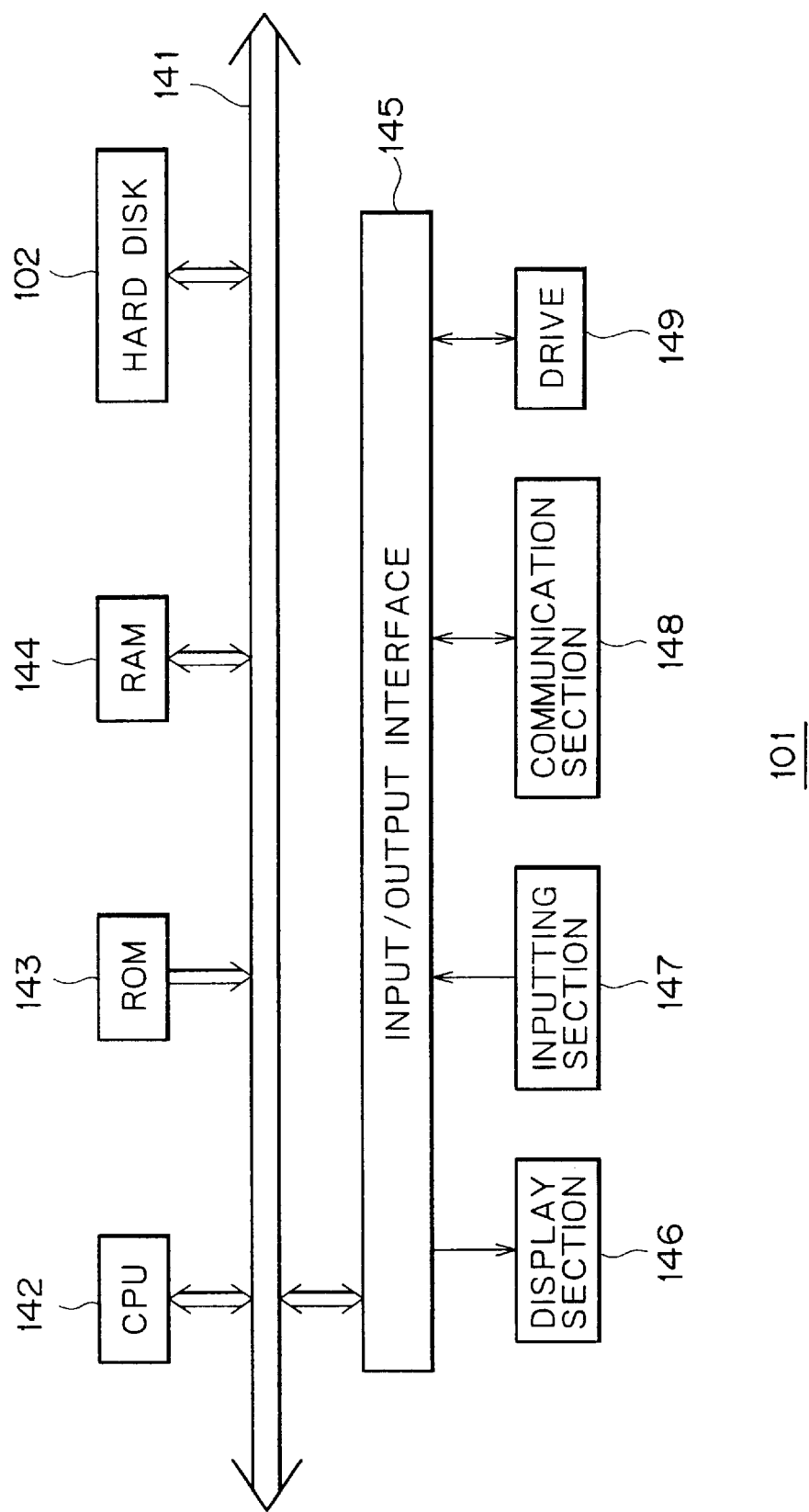
FIG. 22 is a block diagram showing an example of a construction of a personal computer 101 shown in FIG. 21A.

Referring to FIG. 22, for example, the personal computer 101 has a CPU (Central Processing Unit) 142 built therein. An input/output interface 145 is connected to the CPU 142 over a bus 141. If a user operates an inputting section 147 which is formed from a keyboard, a mouse or the like to input an instruction to the CPU 142 through the input/output interface 145, then the CPU 142 executes a program stored in a ROM (Read Only Memory) 143, which corresponds to the semiconductor memory 103 of FIG. 21A, in response to the instruction. Or, the CPU 142 loads into a RAM (Random Access Memory) 144 and executes a program transferred from the satellite 122 or the network 131, received by a communication section 148 and then installed on the hard disk 102 or a program read out from the floppy disk 111, CD-ROM 112, MO disk 113, DVD 114 or magnetic disk 115 loaded on a drive 149 and installed on the hard disk 102. Further, the CPU 142 outputs, when necessary, a result of the processing, for example, to a display unit 146, which is formed from an LCD (Liquid Crystal Display) or the like, through the input/output interface 145.

It is to be noted that, in the present specification, the steps which describe the program provided in the form of a medium may be but need not necessarily be processed in a time series in the order as described, and include processes which are executed parallelly or individually.

Further, the term "system" in the present specification is used to represent an entire apparatus which includes a plurality of apparatus.

While a preferred embodiment of the present invention has been described using specific terms, such description is for illustrative purposes only, and it is to be understood that changes and variations may be made without departing from the spirit or scope of the following claims.

What is claimed is:

1. An information processing method which presents distribution information distributed thereto from a server connected thereto by a network and having predetermined type information and title image data added thereto, comprising:

a first storage step of storing said type information added to said presented distribution information;

a second storage step of receiving and storing said type information and said title image data added to said distributed distribution information;

a calculation step of calculating priority degrees of said distributed distribution information based on said type information added to said presented distribution information and stored at said first storage step and said type information added to said distributed distribution information and stored at said second storage step; and a display control step of controlling a display according to the title image data stored at said second storage step based on said priority degrees calculated at said calculation step.

2. An information processing method according to claim 1, wherein said display control step comprises the step of causing the display according to said title image data added to said distribution information which has a comparatively high priority degree to be displayed with a comparatively great size.

3. An information processing method according to claim 1, wherein said display control step comprises the step of causing the display according to said title image data added to said distribution information which has a comparatively high priority degree to be displayed with a comparatively high degree of distinctness.

4. An information processing method according to claim 1, further comprising:

a selection step of selecting a display of said title image data controlled at said display control step;

a first presentation step of acquiring and presenting, when the display is selected within a predetermined time at said selection step, distribution information to which said title image data of the display is added; and a second presentation step of acquiring and presenting, when the display is not selected within the predetermined time at said selection step, said distribution information having a comparatively high one of the priority degrees calculated at said calculation step from said server.

5. An information processing method according to claim 4, wherein said first presentation step comprises the step of acquiring said distribution information to which said priority degrees set by said server are added from said server and presents said distribution information based on said priority degrees.

6. An information processing apparatus which presents distribution information distributed thereto from a server connected thereto by a network and having predetermined type information and title image data added thereto, comprising:

first storage means for storing said type information added to said presented distribution information;

second storage means for receiving and storing said type information and said title image data added to said distributed distribution information;

calculation means for calculating priority degrees of said distributed distribution information based on said type information added to said presented distribution information and stored in said first storage means and said type information added to said distributed distribution information and stored in said second storage means; and display control means for controlling a display according to the title image data stored in said second storage means based on said priority degrees calculated by said calculation means.

7. A medium for causing a computer to execute a program for information processing when distribution information distributed from a server connected to said computer by a network and having predetermined type information and title image data added thereto is presented, the program including:

a first inputting step of inputting said type information added to said presented distribution information;

a second inputting step of inputting said type information and said title image data added to said distributed distribution information;

a calculation step of calculating priority degrees of said distributed distribution information based on said type information added to said presented distribution information and inputted by the processing in said first inputting step and said type information added to said distributed distribution information and inputted by the processing in said second inputting step; and a display control step of controlling a display according to said title image data inputted by the processing in said second inputting step based on said priority degrees calculated by the processing in the calculation step.

* * * * *